United States Patent [19]
Allen et al.

[11] Patent Number: 4,496,865
[45] Date of Patent: Jan. 29, 1985

[54] METHODS AND APPARATUS FOR TRANSLATING ELECTRIC MOTOR ROTATION INTO LINEAR TRAVEL

[75] Inventors: Robert E. Allen, Woodland Hills; James T. Thomasson, Sunland, both of Calif.

[73] Assignee: Newport Corporation, Fountain Valley, Calif.

[21] Appl. No.: 407,532

[22] Filed: Aug. 12, 1982

[51] Int. Cl.³ ............................................. G01B 7/02
[52] U.S. Cl. .................................. 310/80; 33/164 R; 310/12; 310/14
[58] Field of Search ....................... 310/12, 17, 19, 20, 310/80, 191, 89, 14, 23; 33/164 R, 166, 170

[56] References Cited

U.S. PATENT DOCUMENTS

| | | | |
|---|---|---|---|
| 3,514,865 | 6/1970 | Karahashi | 33/164 R |
| 4,174,575 | 11/1979 | Nakaja | 33/164 R |
| 4,308,666 | 1/1982 | Hahn et al. | 33/166 |
| 4,335,516 | 6/1982 | Edelstein | 33/164 R |

FOREIGN PATENT DOCUMENTS 1228137  4/1971  United Kingdom ................. 33/166

Primary Examiner—J. D. Miller
Assistant Examiner—D. L. Rebsch
Attorney, Agent, or Firm—Benoit Law Corporation

[57] ABSTRACT

Methods of operating, and apparatus including, a rotary electric motor to translate rotation of the motor into linear travel with the aid of a linearly traveling device. This linearly traveling device is restrained against rotation at points peripherally distributed relative to the device. In particular, there is a pair of interfitting parts including a linear keyplate and keyway at each of the peripherally distributed points. One of these interfitting parts is connected to the linearly traveling device and the other of these parts is maintained stationary relative to that one interfitting part. One of the linear keyplates may be provided with a first scale indicating the linear travel in a first system of measurement, such as the metric system, and another linear keyplate may be provided with a second scale indicating the linear travel in a second system of measurement, different from the first or metric system.

6 Claims, 4 Drawing Figures

U.S. Patent  Jan. 29, 1985  4,496,865
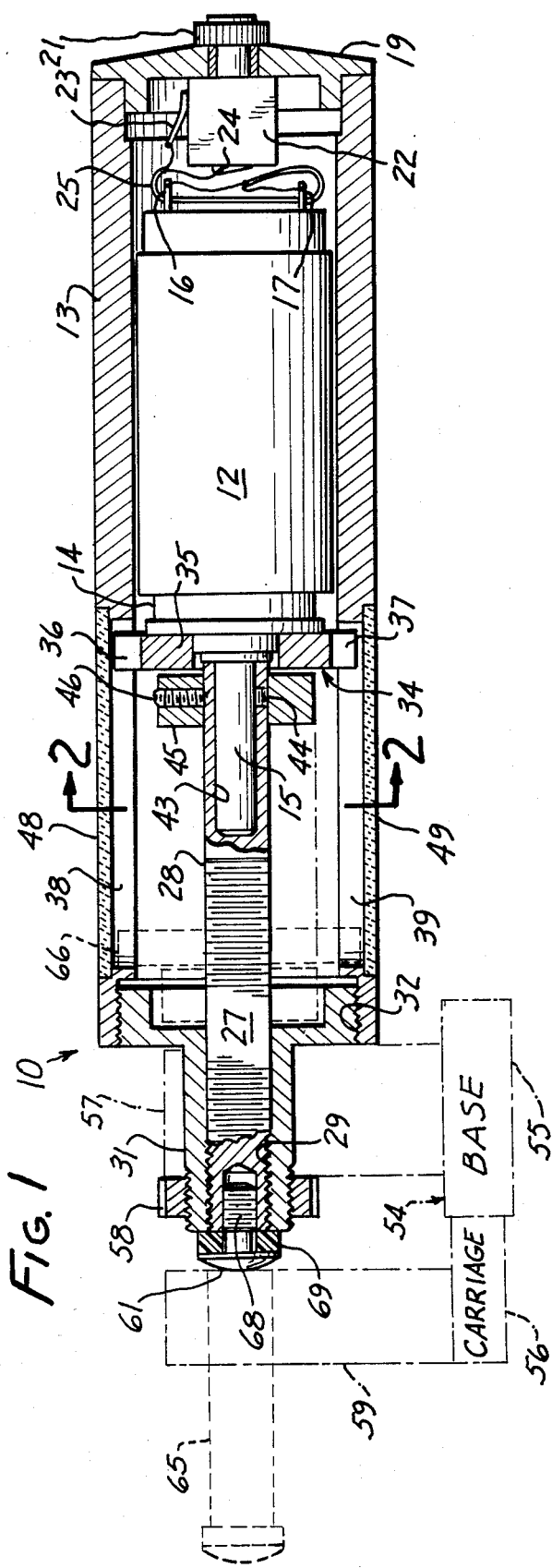
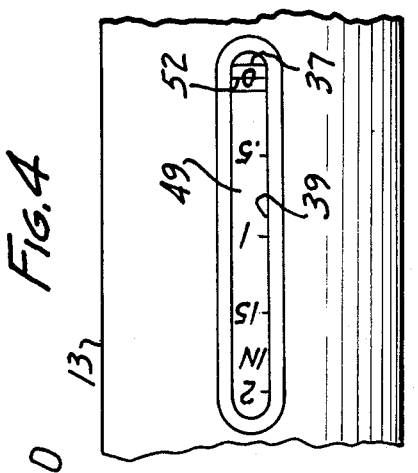
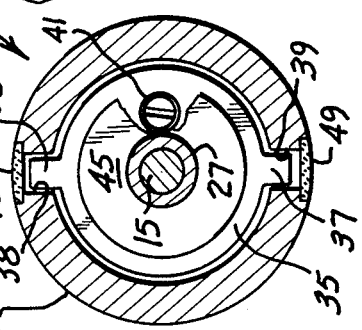
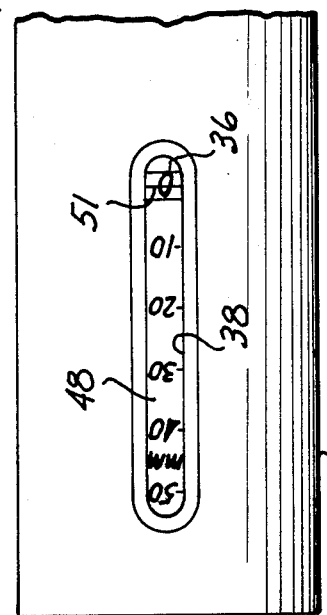

METHODS AND APPARATUS FOR TRANSLATING ELECTRIC MOTOR ROTATION INTO LINEAR TRAVEL

BACKGROUND OF THE INVENTION

1. Field of the Invention

The subject invention relates to electric motors, actuators and actuating methods and, more specifically, to methods of operating or utilizing electric motors, and to apparatus including electric motors, as well as to their design and operation.

2. Disclosure Statement

This disclosure statement is made pursuant to the duty of disclosure imposed by law and formulated in 37 CFR 1.56(a). No representation is hereby made that information thus disclosed in fact constitutes prior art, inasmuch as 37 CFR 1.56(a) relies on a materiality concept which depends on uncertain and inevitably subjective elements of substantial likelihood and reasonableness, and inasmuch as a growing attitude appears to require citation of material which might lead to a discovery of pertinent material though not necessarily being of itself pertinent. Also the following comments contain conclusions and observations which have only been drawn or become apparent after conception of the subject invention or which contrast the subject invention or its merits against the background of developments subsequent in time or priority.

In recent years, mechanical actuators have reached a high state of perfection. By way of example, reference may in this respect be had to U.S. Pat. No. 4,174,575, by Kyohiro Nakata, issued Nov. 20, 1979, for Measuring Instrument, and now assigned to the assignee of the subject patent application or patent. One of the measuring instruments disclosed in that patent is a differential micrometer having an adjustment precision of one-half micrometer or 0.0005 millimeters. While that micrometer is, of course, very useful as a measuring instrument, it also serves as a high-precision actuator in such delicate applications an optical component adjustment in holographic or other laser beam utilization systems. A disadvantage of using differential micrometers as component actuators is, however, that they are manually operated.

Attempts have thus been made to provide electrically energized actuators which could take the place of the manually operated micrometer type. Accordingly, a small electric motor with reduction gearhead has been accommodated in a tubular housing, for axial movement. The output shaft of the gearhead was attached to a threaded spindle which extended through an internal thread in a front piece of the housing. To inhibit rotation of the motor and gearhead, a longitudinal keyway was provided in the housing, while an antirotation device having a key projection running in the keyway was attached to the gearhead. The motor through its gearhead rotated the threaded spindle, which thus at least in theory would translatorily move out of and alternatively into the internally threaded front piece of the housing.

In practice, the latter approach has several problems. For one thing, the key device would pivot or cant when running under load, thereby incurring side loads from torquing. On the other hand, attempts at reducing the side load exposed the gearhead to disintegration when the spindle was reaching its extremity of translatory motion.

SUMMARY OF THE INVENTION

It is a general object of this invention to overcome the disadvantages and to meet the needs expressed or implicit in the above disclosure statement or in other parts hereof.

It is a germane object of this invention to provide improved motorized micrometers and actuators.

It is a related object of this invention to provide improved devices for converting rotation into translatory motion.

Other objects of this invention will become apparent in the further course of this disclosure.

From one aspect thereof, the subject invention resides in a method of operating or an apparatus including a rotary electric motor in a tubular housing and, more specifically, resides in the improvement comprising, in combination, the steps of, providing two diametrically opposed keyways in said tubular housing, providing a keyplate for or means for, translating rotation of the motor into linear travel, attaching the keyplate to the motor for axial movement of the motor in the housing, and restraining such keyplate against rotation at two points diametrically opposite each other relative to such keyplate, by providing the keyplate with two keys located opposite each other and projecting into the diametrically opposed keyways, with the two keys and keyplate being provided as one solid unit.

From another aspect thereof, the subject invention resides in an actuator or other apparatus, including a rotary electric motor and, more specifically, resides in the improvement comprising, in combination, a tubular housing having diametrically opposed keyways therein, means including a linearly traveling keyplate in the housing for translating rotation of the motor into linear travel, means for attaching the keyplate to the motor for axial movement of the motor in the housing, means for restraining the linearly traveling keyplate and motor against rotation at two points diametrically opposite each other relative to the keyplate, including two keys diametrically opposite each other and projecting into the diametrically opposed keyways, the two keys and keyplate being in one solid unit.

Other aspects of the invention will become apparent in the further course of this disclosure, and no limitation to any invention, aspect, scope, object, feature, combination, step or component is intended by this summary of invention.

BRIEF DESCRIPTION OF THE DRAWINGS

The subject invention and its various aspects and objects will become more readily apparent from the following detailed description of preferred embodiments thereof, illustrated by way of example in the accompanying drawings, in which like reference numerals designate like or functionally equivalent parts, and in which:

FIG. 1 is a longitudinal section of a motorized actuator according to a preferred embodiment of the subject invention;

FIG. 2 is a view taken on the line 2—2 in FIG. 1;

FIG. 3 is a partial top view of the apparatus shown in FIG. 1; and

FIG. 4 is a bottom view of the apparatus shown in FIG. 1.

DESCRIPTION OF PREFERRED EMBODIMENTS

The motorized linear actuator 10 shown in FIGS. 1 to 4 has a cylindrical electric motor 12 axially movable in a hollow-cylindrical housing 13. The motor 12 has a reduction gearhead 14 attached. The gearhead has an output shaft 15 which rotates upon energization of the motor 12 via motor terminals 16 and 17.

The tubular actuator housing 13 has an end cap 19 removably fitted in an end portion thereof. By way of example, the tubular housing 13 may be of a metal, such as aluminum, while the end cap 19 may, for instance, be of a plastic material press fitted into the tubular housing.

In the illustrated embodiment, a phone jack 21 or similar receptacle extends through the end cap 19 into a terminal box having terminals 23 and 24 protruding from it. These terminals 23 and 24, which receive electric energizing current for the motor 12 through the jack 21, are connected to the motor terminals 16 and 17 via a couple of wires contained in a cable 25 which is long enough to permit axial travel of the motor 12 in the tubular housing 13.

The actuator 10 translates rotation of the motor 12 or gearhead output shaft 15 into linear travel of a threaded spindle 27.

To this end, the spindle 27 has an external thread 28 meshing with an internal thread 29 of a nose or front piece 31 of the actuator 10. The front piece 31, in turn, is threaded into a front end of the tubular housing 13 at 32.

The actuator 10 further includes a linearly traveling device 34 for translating rotation of the motor 12 into linear travel of the spindle 27. The linearly traveling device 34 includes a keyplate 35 having at least two keys 36 and 37 projecting, respectively, into keyways 38 and 39, provided in the tubular housing 13.

The keyplate 35 is attached to the gearhead 14 by such fasteners as screws, one of which is apparent at 41 in the cutout portion of FIG. 2. In this manner, rotation of motor 12 and gearhead 14 relative to the keyplate 35 and thereby to the tubular housing 13 is inhibited. On the other hand, the threaded spindle 27 rotates as it thrusts forward out of, and as it retracts into, the front piece 31. However, such rotation is not essential, and the broad aspects of the subject invention are not intended to be so limited. Rather, the scope of the subject invention extends to apparatus in which the thrusting element of the actuator merely moves linearly without rotation, as in the above mentioned differential micrometers.

In the illustrated embodiment of the invention, the leadscrew or spindle 27 has a receiving hole or bore 43 for the gearhead shaft 15 and is attached thereto by a set screw 44, or by an adhesive or other fastener. A retainer or stop element 45 is located ahead of the keyplate 35 and is retained on the spindle 27 by one or more set screws 46. The keyplate 35 is thus disposed between the gearhead 14 and stop element 45, with the stop element 45 being rotatable with the spindle 27.

According to the aspect of the invention of which a preferred embodiment is illustrated in FIGS. 1 and 2, the linearly traveling device 34 is restrained against rotation at points peripherally distributed relative to such device, by providing at each of the points a pair of interfitting parts including a linear guide 38 or 39 and a member 36 or 37 guided thereby, and by connecting one of such interfitting parts, such as the key 36 or 37, to the linearly traveling device 34 and maintaining the other of the interfitting parts, such as the keyway 38 or 39, stationary relative to the one interfitting part 36 or 37.

In the illustrated preferred embodiment, interfitting parts 36 and 38 and 37 and 39 are peripherally distributed at two points relative to the traveling device 34, namely, at two points diametrically opposite each other on the keyplate 35. In prototypes of the illustrated actuator 10, this feature enabled a quadrupling of the thrust of the actuator at the spindle 27 relative to actuators with a single key and keyway. As seen in FIGS. 1 and 2, the two keys 36 and 37 and the keyplate 35 are provided as or are in one solid unit.

In this manner, the keys and keyways are capable of absorbing motor-generated side loads, keeping them away from the spindle mechanism.

In the illustrated preferred embodiment of the invention, the keyways 38 and 39 are machined or otherwise provided at high precision as antirotation slots in the front half of the tubular housing 13.

Each antirotation slot 38 and 39 is covered by a window 48 or 49 of molded clear styrene, acrylic or another suitable transparent material through which the tab or key 36 or 37 may be observed in its travel along the keyway or slot 38 or 39, and at any rest position. In this respect, each key 36 and 37 is provided with an indicator line 51 and 52, respectively, while each window 48 and 49 is provided with a linear scale. As a special feature of the illustrated preferred embodiment, the scale at the window 48 thus indicates travel of the actuator 10 or spindle 27 in millimeters and fractions thereof, while the scale at the window 49 indicates such travel in inches and fractions thereof.

It is thus seen that the preferred illustrated embodiment of the invention provides one of the keyways or linear guides 38 with a first scale as shown in FIG. 3, indicating linear travel of the actuator 10 in a first system of measurement, such as the metric system, with the aid of a member 36 guided by that one linear guide 38, and further provides another of the keyways or linear guides 39 with a second scale, as seen, for instance, in FIG. 4, indicating the linear travel of the actuator 10 in a second system of measurement, such as the inch system, different from the first system, with the aid of a member 37 guided by the other linear guide 39. In practice, this is a great convenience, since this enables the user of the actuator to operate in different systems of measurements without the need for metric or other conversion.

The electric motor 12 preferably is of a permanent magnetic field or other type that reverses its direction of rotation upon reversal of polarity at the motor terminals 16 and 17. Accordingly, if the motor is energized through the jack 21 with an electric current of a first polarity, it rotates the gear output shaft 15 and thereby the spindle 27 in a first direction so that the motor 12, gearhead 14, keyplate 35, stop element 45 and spindle 27 travel to the left as seen in FIG. 1, while the rotating spindle 27 threads itself through the front piece 31. The spindle 27 is thus thrust out of the front piece 31 as seen in FIG. 3.

The spindle 27 is thus able to actuate any desired instrument or part. By way of example, FIG. 1 shows in dotted outline and on a reduced scale a carriage structure 54 including a base 55 and a carriage 56 slidable relative thereto. The front piece 31 of the actuator 10 extends through a bracket 57 of the base, and is mounted thereon with the aid of a nut 58 meshing with a threaded end of the front piece 31. The carriage 56 has a rigid arm 59 which is engaged by the spindle 27 or by a special tip 61 thereof. If desired or necessary, the carriage 56 may be biased into or toward the base 55 by a spring or other suitable device (not shown).

By way of example, the carriage 56 may be the carrier of an optical component, such as a lens or mirror in a holographic or other laser beam utilization system (not shown). In that case, the base 55 may be attached to an optical table or other rigid reference surface (not shown). In such and similar scientific or high-technology work, adjustment resolutions in the micron and sub-micron range are now frequently a necessity.

In practice, this need is often coupled with a requirement that the achievable travel of the adjustment be some ten to hundred thousand times larger than the required resolution.

The subject invention enables these requirements to be met in an electrically controlled manner with electrically driven actuators.

The main advantage of the tip 61 is the facility of providing a hardened metallic or other special surface for pushing against a surface of a carriage arm 59 or other part to be actuated. In the illustrated preferred embodiment, the tip 61 has a concave configuration. The convex tip 61 provides practically a single point contact with the part to be acuated. In practice, the shape of the tip 61 can be varied to accommodate various contact configurations. By way of example, the tip 61 may be provided with a conical configuration, as indicated in FIG. 3 in dotted outline 63, in order to fit a "V-groove" in a part to be actuated.

As the motor 12 keeps rotating in one direction, the actuator 10 eventually reaches its outer extreme extension, as indicated in dotted outline at 65 in FIG. 1. At that point, the keyplate 35 and the stop element 45 also reach their extreme outward limit of travel, indicated in dotted outline at 66 in FIG. 1. The element 45 may be designed as a stop engaging the inside of the front piece 31, thereby preventing further linear outward travel of the spindle 27. The stop element 45 may be made of metal or, if desired, of plastic in order to cushion the stopping function. The keyplate 35 may also be a molded plastic part.

The tip 61 may be in the form of a screw threaded into an internally threaded axial front bore 68 of the threaded spindle 27. The head of the tip 61 may have a larger diameter or dimension than the diameter of the spindle 27, so as to provide for a stop limiting retraction of the spindle 27 into the front piece 31 of the actuator. A washer 69 of Teflon or another sturdy cushioning material may be provided between the spindle 27 and the head of the tip 61, in order to cushion and absorb any thrust and shock of the retracting spindle 27 running into its limit.

In order to avoid pinching of the cable 25 between the housing 13 and motor 12 during travel thereof, a disc (not shown) may be attached to the rear end of the motor 12 at terminals 16 and 17 so as to close the annular gap between the motor 12 and housing 13 and wipe along the inside of the housing 13 during travel of the motor.

The linear actuator shown in FIGS. 1 to 4 may be energized in any desired manner, such as by application of a controlled electric current through the jack 21 to the electric motor 12. Limit switches (not shown) or equivalents thereof may be employed to stop the motor 12 upon the stop elements 45 and 61 or 69 reaching their limits.

The subject invention and its embodiments meet the initially stated needs and objectives and overcome the initially stated disadvantages.

The subject extensive disclosure will render apparent and suggest to those skilled in the art various modifications and variations within the spirit and scope of the subject invention.

We claim:

1. A method of operating a rotary electric motor in a tubular housing, comprising the steps of:
   providing two diametrically opposed keyways in said tubular housing;
   providing a keyplate for translating rotation of said motor into linear travel;
   attaching said keyplate to said motor for axial movement of said motor in said housing; and
   restraining said keyplate against rotation at two points diametrically opposite each other relative to said keyplate, by providing said keyplate with two keys located opposite each other and projecting into said diametrically opposed keyways, with said two keys and keyplate being provided as one solid unit.

2. A method as claimed in claim 1, including the steps of:
   providing one of said keyplates with a first scale indicating said linear travel in a first system of measurement with the aid of a corresponding one of said keys; and
   providing the other of said keyways with a second scale indicating said linear travel in a second system of measurement different from said first system of measurement with the aid of the other of said keys.

3. In apparatus including a rotary electric motor, the improvement comprising in combination:
   a tubular housing having diametrically opposed keyways therein;
   means including a linearly traveling keyplate in said housing for translating rotation of said motor into linear travel;
   means for attaching said keyplate to said motor for axial movement of said motor in said housing;
   means for restraining said linearly traveling keyplate and motor against rotation at two points diametrically opposite each other relative to said keyplate, including two keys diametrically opposite each other and projecting into said diametrically opposed keyways, said two keys and keyplate being in one solid unit.

4. Apparatus as claimed in claim 3, including:
   means including a first scale at one of said keyways for indicating said linear travel in a first system of measurement with the aid of a corresponding one of said keys; and
   means including a second scale at the other of said keyways for indicating said linear travel in a second system of measurement different from said first system of measurement with the aid of the other of said keys.

5. A method of operating a rotary electric motor, comprising the steps of:
   translating rotation of said motor into linear travel with the aid of a linearly traveling device;
   restraining said linearly traveling device against rotation at points distributed diametrically opposite each other relative to said device, by providing at each of said points a pair of interfitting parts including a linear guide and a member guided thereby, and by connecting one of said interfitting parts to said linearly traveling device and maintaining the other of said interfitting parts stationary relative to said one interfitting part;

providing one of the linear guides with a first scale indicating said linear travel in a first system of measurement with the aid of a member guided by said one linear guide; and providing another of the linear guides with a second scale indicating said linear travel in a second system of measurement with the aid of a member guided by said said other linear guide.

6. A method as claimed in claim 2, including the steps of:

providing each of said keys with an indicator line for its corresponding scale.

* * * * *